UNITED STATES PATENT OFFICE.

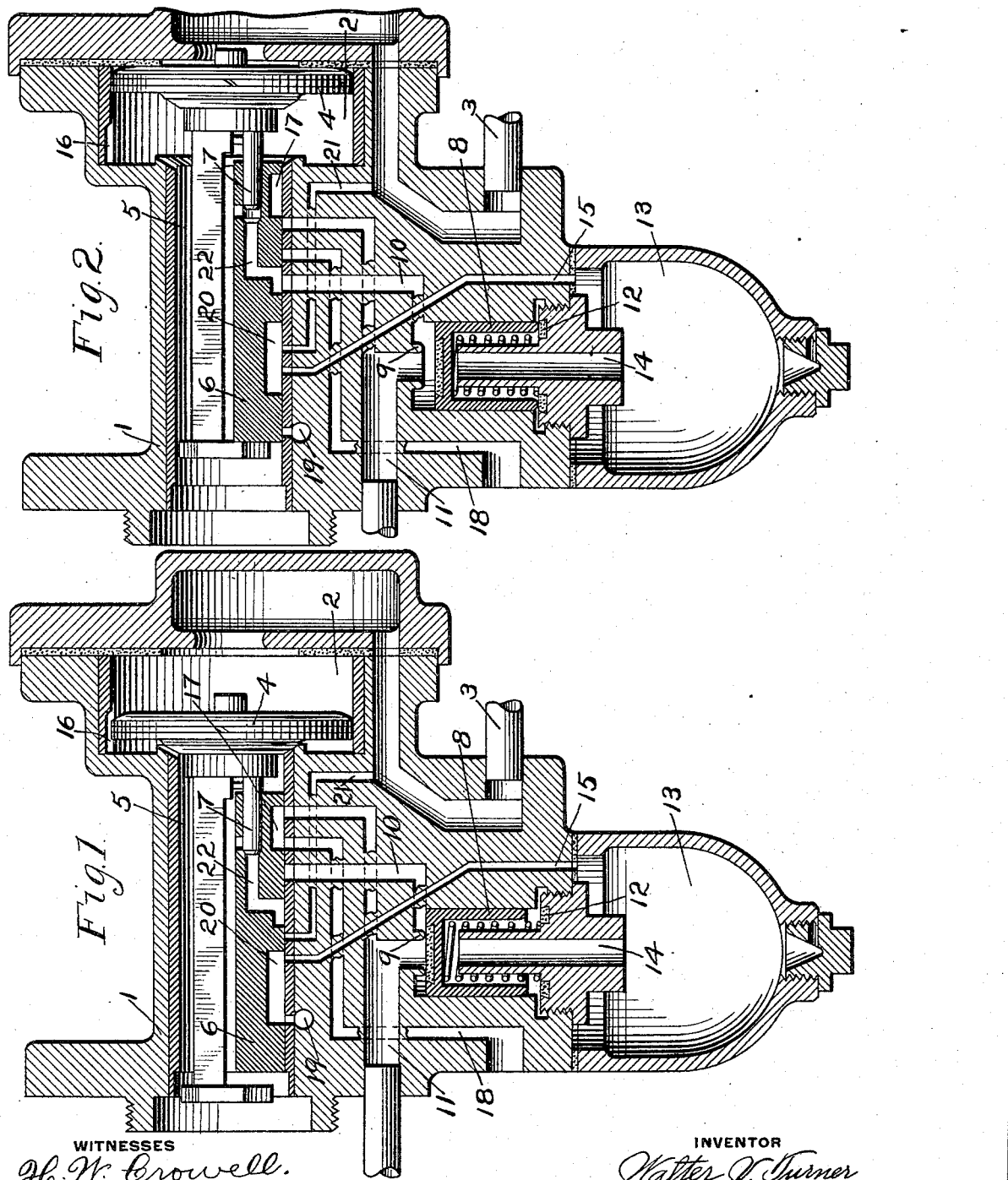

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,187,568.      Specification of Letters Patent.      Patented June 20, 1916.

Application filed March 24, 1915. Serial No. 16,622.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to a brake apparatus for securing a more uniform brake action in an emergency or full service application of the brakes.

It has heretofore been proposed to supply fluid to the brake cylinder through a restricted port, so as to secure a slow build up of brake cylinder pressure at the head end of the train and thus prevent an excessive brake pressure at the head end until the brakes at the rear end have been partially applied.

This prevents dangerous shocks due to the running in of the rear unbraked cars against the braked cars at the head end of the train, but to be sufficiently effective, the port through which fluid is supplied to the brake cylinder must be quite small and such a small port is liable at times to become clogged with dirt.

The principal object of my invention is to provide means for limiting the rate of build up of brake cylinder pressure to that secured through a restricted port but without employing such a port.

For this purpose, a valve device is employed which controls a large port opening for supplying fluid to the brake cylinder but having means adapted to effect the intermittent opening and closing of the valve device, so that being open only a part of the time, the mean flow can be made to equal only that which would pass through a restricted port.

In the accompanying drawing; Figure 1 is a central sectional view of a triple valve device embodying my invention, showing the parts in normal release position; and Fig. 2 a similar view, showing the parts in emergency application position.

The triple valve device may comprise a casing 1 having a piston chamber 2 connected to brake pipe 3 and containing triple valve piston 4, and having a valve chamber 5, open to the usual auxiliary reservoir, and containing main slide valve 6 and graduating valve 7.

According to my invention, flow of fluid from the auxiliary reservoir to the brake cylinder is controlled by a valve piston 8 adapted in one position to engage a valve seat 9 and cut off communication from a supply passage 10 to brake cylinder passage 11 and in another position to open said communication and engage a seat 12. A vent chamber 13 communicates through a passage 14 with the under side of the valve piston 8 and a passage 15 leads from said vent chamber to the seat of the main slide valve 6.

In operation, the triple valve piston being in normal release position, as shown in Fig. 1, fluid from the brake pipe equalizes through the feed groove around the piston 4 into valve chamber 5 and charges the auxiliary reservoir in the usual manner, and the brake cylinder is open to the exhaust through passage 11, cavity 17 in the slide valve 6 and exhaust passage 18. Passage 15 is also connected to an atmospheric exhaust port 19 through cavity 20, so that vent chamber 13 is normally at atmospheric pressure. When a reduction in brake pipe pressure is made, the triple valve piston 4 is moved to application position, as shown in Fig. 2 of the drawing, which is the same for both service and emergency applications, except that under a gradual reduction in brake pipe pressure the triple valve piston will move the valves only far enough to open communication from the auxiliary reservoir to the brake cylinder, such that the rate of reduction in auxiliary reservoir pressure by flow to the brake cylinder will substantially equal the rate of reduction in brake pipe pressure. The movement of the slide valve 20 toward application position first opens communication from the brake pipe to the chamber 13 through passage 21, cavity 20, and passage 15, so that a local reduction in brake pipe pressure is effected. Further movement of the slide valve opens the service port 22, so that fluid from the auxiliary reservoir flows past the graduating valve 7, through the service port 22, and passage 10 to the exposed area of the piston 8. The pressure in the chamber 13 is at this time lower than the auxiliary reservoir pressure, so that the piston 8 will be forced from its upper seat, to allow free flow of air to the brake cylinder. The chamber 13 being still connected to the brake pipe, the pressure therein will now reduce with the brake pipe pressure, but since the auxiliary reservoir pressure drops very quickly by expansion into the brake cylinder, the pressure in chamber 13 will soon exceed that acting on the opposite side of the piston. The piston 8 will then be forced to its upper seat, cutting off further flow of air to the brake cylinder. As the reduction in brake pipe pressure continues, a point is reached where the pressure acting above the piston again exceeds the pressure in chamber 13 and then the piston will again open to permit further flow of air from the auxiliary reservoir to the brake cylinder. In the same manner the piston continues to intermittently open and close during an application of the brakes and by this means, a very gradual build up of brake cylinder pressure is obtained, without the necessity for employing a small supply passage.

Having now described my invention, what I claim as new and desire to secure by Letters Patent, is:

1. In a fluid pressure brake, the combination with a brake pipe, of a valve device operated upon a reduction in brake pipe pressure for intermittently supplying fluid to the brake cylinder to apply the brakes.

2. In a fluid pressure brake, the combination with a brake pipe, of a valve device operating upon a reduction in brake pipe pressure for intermittently opening and closing communication through which fluid is supplied from a source to the brake cylinder to apply the brakes.

3. In a fluid pressure brake, the combination with a brake pipe, of a valve device subject on one side to brake pipe pressure and on the opposite side to the pressure of fluid flowing to the brake cylinder and adapted upon a reduction in brake pipe pressure to intermittently open and close communication through which fluid is supplied to the brake cylinder.

4. In a fluid pressure brake, the combination with a brake pipe, of a piston subject on one side to the pressure of fluid vented from the brake pipe in applying the brakes and on the opposite side to the pressure of fluid supplied to the brake cylinder and adapted to open communication for supplying fluid to the brake cylinder when the pressure of the brake cylinder supply exceeds the pressure of fluid vented from the brake pipe, and to close said communication when the pressure of fluid vented from the brake pipe exceeds the pressure of the brake cylinder supply.

5. In a fluid pressure brake, the combination with a brake pipe and a triple valve device, of a valve piston subject on one side to the pressure of fluid supplied to the brake cylinder in applying the brakes and on the other side to the pressure of a chamber normally at atmospheric pressure, and ports controlled by said triple valve device for supplying fluid from a source of pressure to the brake cylinder supply side of the valve piston and from the brake pipe to said chamber upon movement of the triple valve device to application position.

In testimony whereof I have hereunto set my hand.

WALTER V. TURNER.

Witnesses:
A. M. CLEMENTS,
S. W. KEEFER.

Copies of this patent may be obtained for five cents each, by addressing the "Commissioner of Patents, Washington, D. C."